US008249555B2

(12) United States Patent
Hahn et al.

(10) Patent No.: US 8,249,555 B2
(45) Date of Patent: Aug. 21, 2012

(54) METHOD FOR PERFORMING INITIAL RANGING IN WIRELESS COMMUNICATION SYSTEM

(75) Inventors: Gene Beck Hahn, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 12/596,366

(22) PCT Filed: Apr. 16, 2008

(86) PCT No.: PCT/KR2008/002135
§ 371 (c)(1),
(2), (4) Date: Oct. 16, 2009

(87) PCT Pub. No.: WO2008/130126
PCT Pub. Date: Oct. 30, 2008

(65) Prior Publication Data
US 2010/0093347 A1 Apr. 15, 2010

(30) Foreign Application Priority Data

Apr. 18, 2007 (KR) .......................... 10-2007-0037787
Feb. 5, 2008 (KR) .......................... 10-2008-0011900

(51) Int. Cl.
*H04M 1/66* (2006.01)

(52) U.S. Cl. ........................................ 455/411; 380/249
(58) Field of Classification Search .................. 713/171; 455/411, 410; 380/249, 270, 30, 282
See application file for complete search history.

(56) References Cited

U.S. PATENT DOCUMENTS

| 8,014,377 B2* | 9/2011 | Zhang et al. .................. 370/349 |
| 2005/0048952 A1* | 3/2005 | Saito et al. ..................... 455/411 |
| 2005/0192011 A1 | 9/2005 | Hong et al. |
| 2005/0289347 A1* | 12/2005 | Ovadia ........................ 713/171 |
| 2006/0170406 A1 | 8/2006 | Kawashima et al. |
| 2008/0137853 A1* | 6/2008 | Mizikovsky et al. ......... 380/247 |

FOREIGN PATENT DOCUMENTS

KR 10-2006-0066408 A 6/2006
* cited by examiner

*Primary Examiner* — Tu X Nguyen
(74) *Attorney, Agent, or Firm* — Birch, Stewart, Kolasch & Birch, LLP

(57) ABSTRACT

A method of enabling a mobile station to perform initialization to a base station in a wireless communication system is provided. The method includes synchronizing with the base station, obtaining an uplink parameter based on the synchronization, performing initial ranging by using the uplink parameter and establishing security association between the mobile station and the base station while performing the initial ranging. During the initial ranging, a mobile station's unique identifier or control signaling can securely be transmitted.

10 Claims, 4 Drawing Sheets

[Fig. 1]
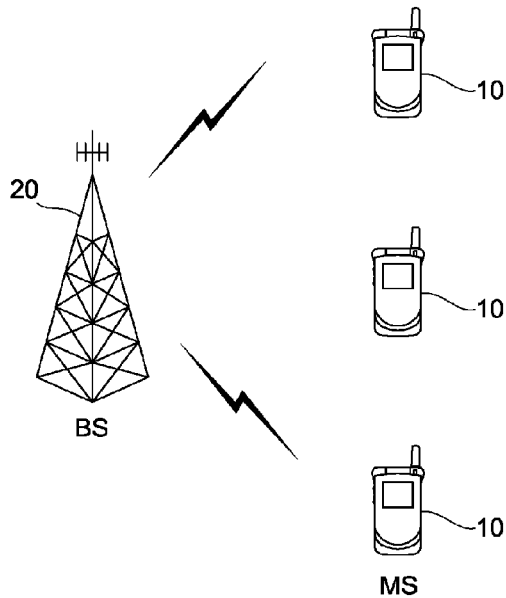
[Fig. 2]
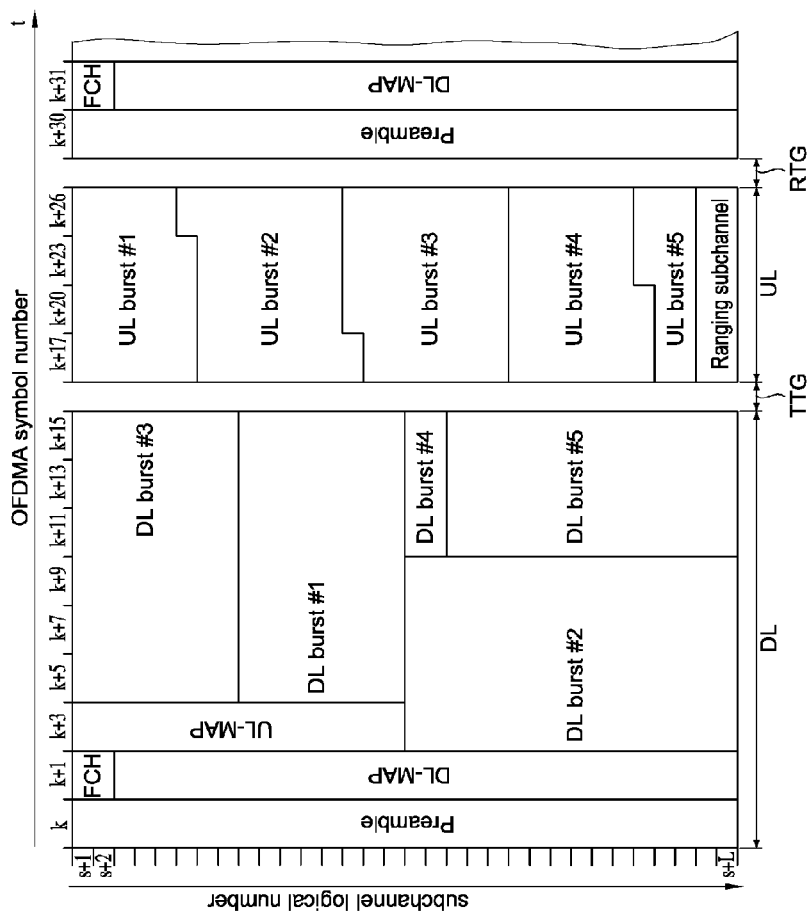

[Fig. 3]
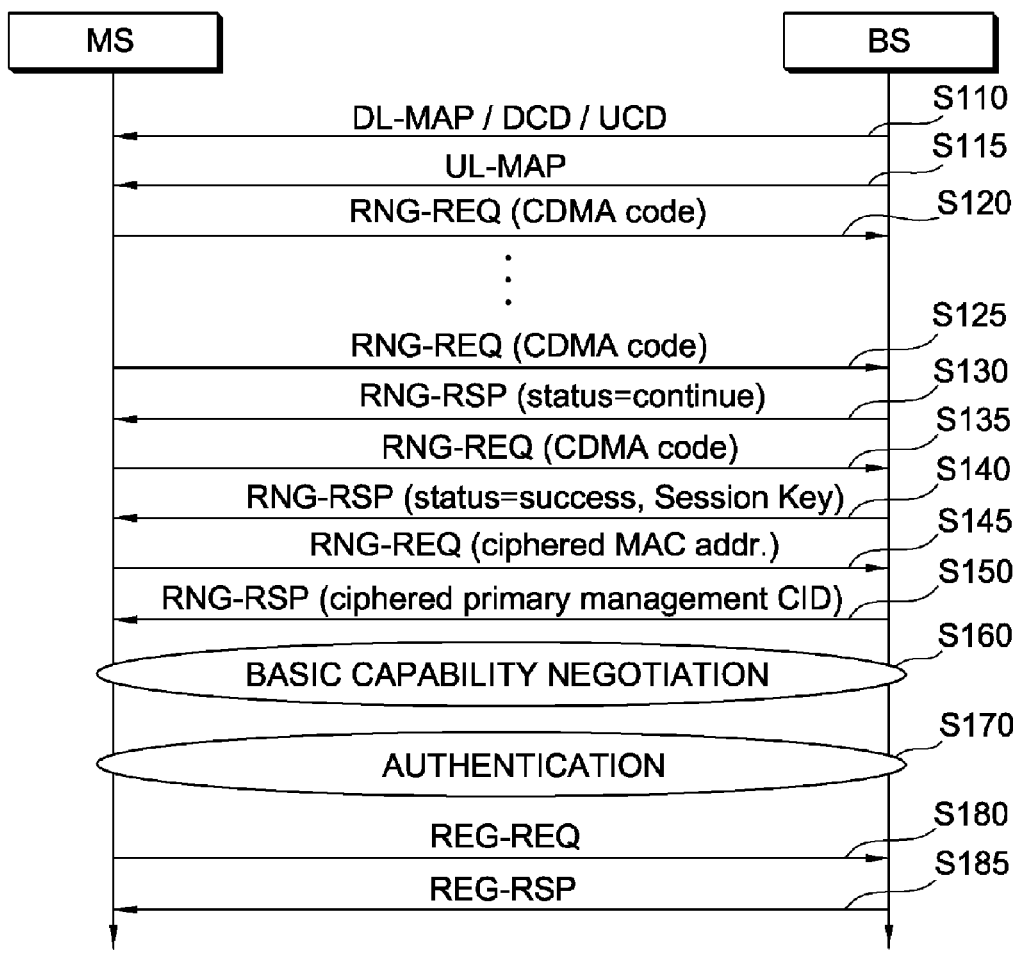

[Fig. 4]
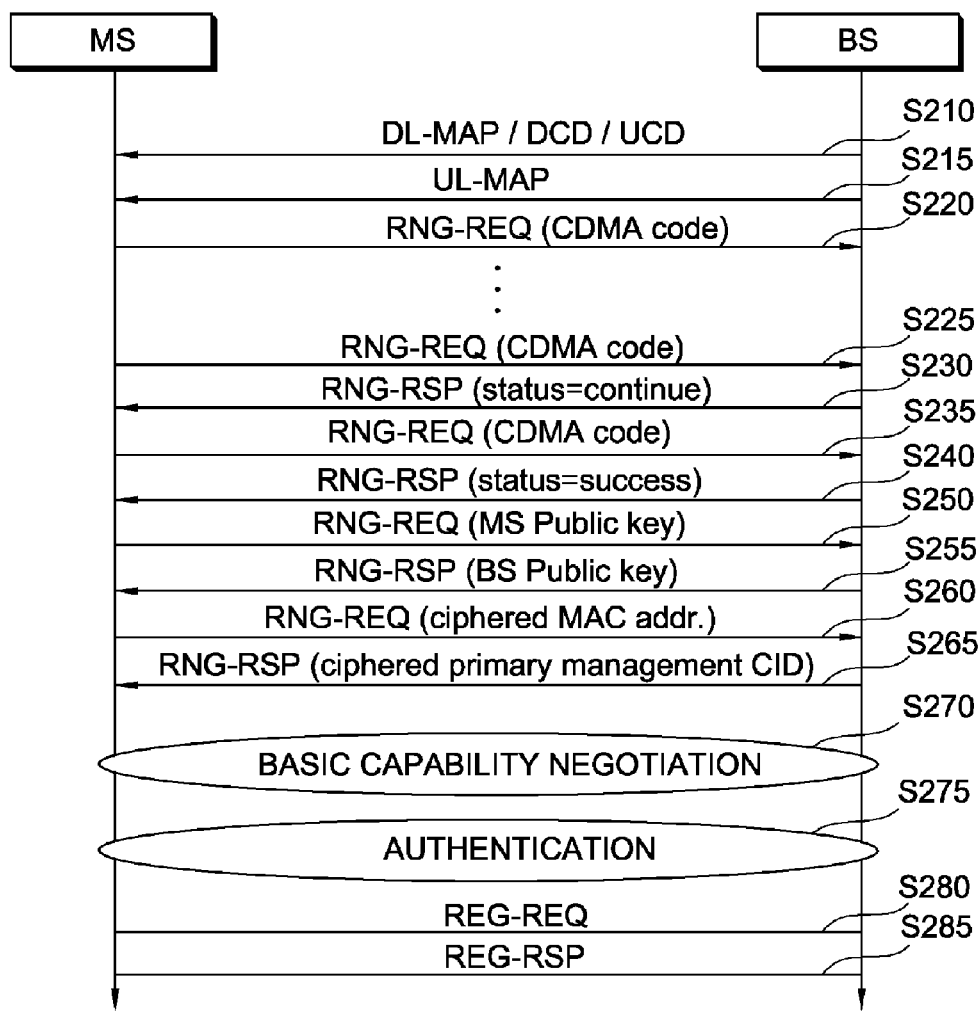

[Fig. 5]
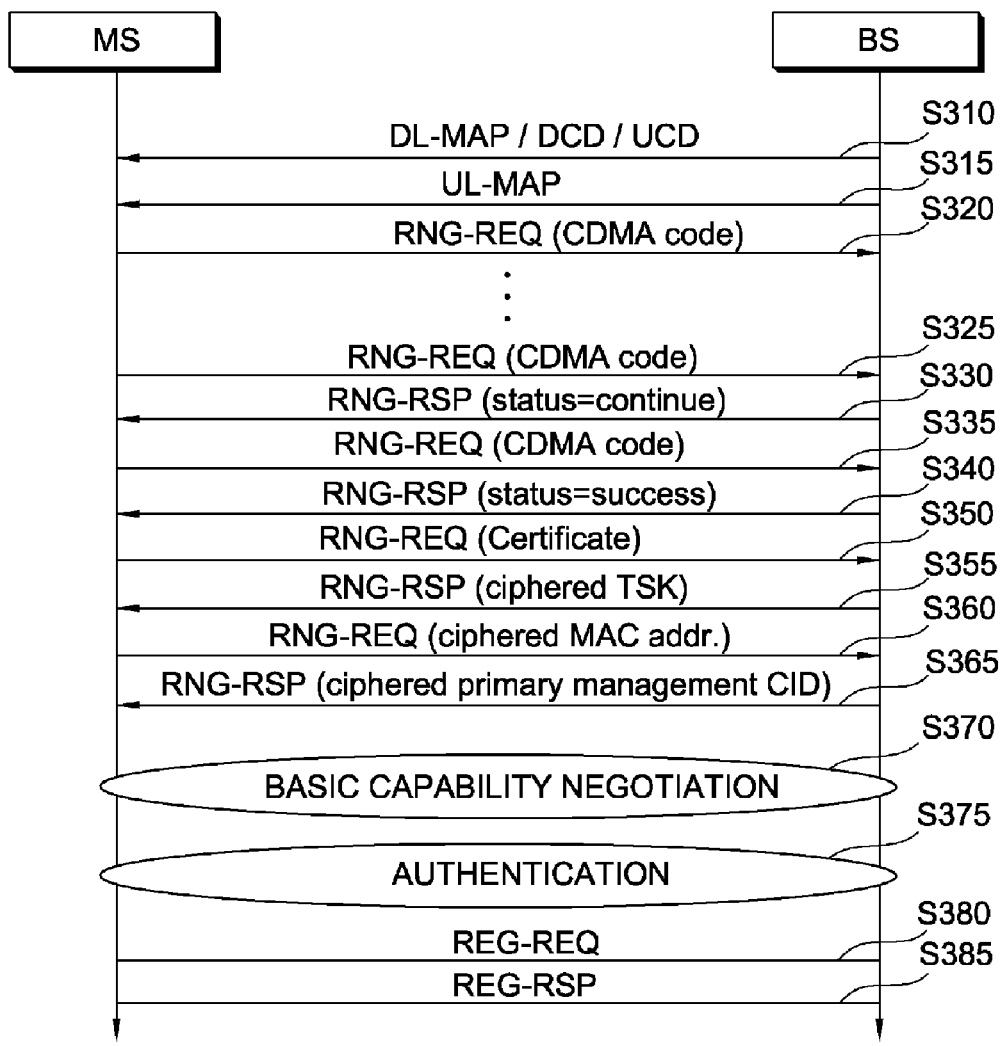

METHOD FOR PERFORMING INITIAL RANGING IN WIRELESS COMMUNICATION SYSTEM

TECHNICAL FIELD

The present invention relates to wireless communication, and more particularly, to a method of performing initial ranging to support location privacy in a wireless communication system.

BACKGROUND ART

A next generation multimedia wireless communication system that has been actively researched is required to process not only voices but also images, packet data and the like.

Location based services such as an emergency rescue service or a child monitoring service are one of next generation services. However, unsecured location based services may be vulnerable to an unauthorized access that steals location information of a mobile station (MS). If the location information of the MS is exposed, the location information may be used for unauthorized access and undesired exploitation. Accordingly, it is essential to protect privacy of location information of the MS in a wireless communication system. Capability of protecting the location information of the MS against unknown exploiters is called as location privacy.

Orthogonal frequency division multiplexing (OFDM) is a multi-carrier modulation technique using a plurality of orthogonal subcarriers. Orthogonal frequency division multiple access (OFDMA) is a technique for providing multiplexing of multi-users by combining the OFDM with frequency division multiple access (FDMA) or time division multiple access (TDMA).

IEEE (Institute of Electrical and Electronics Engineers) 802.16 standard is based on the OFDM/OFDMA. In the IEEE 802.16 standard, ranging is a collection of processes by which a MS and a BS maintain the quality of the RF communication link between them. The ranging consists of two types: initial ranging and periodic ranging. The first serves to initiate registration (or re-registration) of a MS with a base station (BS). The second served to periodically readjust physical parameters of the MS and to verify that the MS is still on line. The initial ranging is needed for a procedure in which the MS registers with the BS or a handover.

Hereinafter, downlink indicates communication from the BS to the MS, and uplink indicates communication from the MS to the BS.

Initial ranging is the procedure to obtain an accurate timing offset between the MS and the BS and to adjust transmission power. When a MS is turned on, the MS achieves downlink synchronization from downlink preambles. Subsequently, the MS performs the initial ranging so as to adjust uplink timing offset and transmission power. After the initial ranging is completed, periodic ranging is periodically performed to track uplink timing offset and received signal strength.

In general, after initial ranging is completed, authentication between the MS and the network is performed to allocate a message authentication code. The message authentication code is used to protect messages which are exchanged between a MS and a BS from being exposed to another MS. However, a method of protecting location privacy before the authentication between the MS and the network is completed is not disclosed.

A method is sought of preventing the location information of the user from being exposed before the authentication between the MS and the network is completed.

DISCLOSURE OF INVENTION

Technical Problem

A method of performing initial ranging to support location privacy is provided.

A method of performing network initialization to prevent exposure of control signaling is provided.

Technical Solution

In an aspect, a method of enabling a mobile station to perform initialization to a base station in a wireless communication system is provided. The method includes synchronizing with the base station, obtaining an uplink parameter based on the synchronization, performing initial ranging by using the uplink parameter and establishing security association between the mobile station and the base station while performing the initial ranging.

In another aspect, a method of performing initial ranging in a wireless communication is provided. The method includes transmitting a ranging request message and receiving a ranging response message in response to the ranging request message, the ranging response message including a session key for ciphering.

In still another aspect, a method of performing initial ranging in a wireless communication is provided. The method includes receiving a first ranging request message, transmitting a first ranging response message indicating that ranging process is successful, receiving a second ranging request message including a mobile station public key for ciphering and transmitting a second ranging response message including a base station public key in response to the second ranging request message.

In still another aspect, a method of performing initial ranging in a wireless communication system is provided. The method includes transmitting a first ranging request message, receiving a first ranging response message indicating that ranging process is successful, transmitting a second ranging request message including a certificate and receiving a second ranging response message including a temporary session key, wherein the temporary session key is ciphered through a public key in the certificate.

In still another aspect, a method of performing initial ranging in a wireless communication system is provided. The method includes receiving a ranging request message including a certificate, generating a temporary session key through a public key in the certificate and transmitting a ranging response message including the temporary session key.

Advantageous Effects

When a mobile station (MS) enters a network or a MS performs handover, the network and the MS negotiates security association before authentication is completed. A MS's unique identifier or control signaling can be ciphered and securely be transmitted. A ciphering process through a temporary security association enables a media access control (MAC) management message and/or control signaling to be securely transmitted after initial ranging is started. Data confidentiality can be secured.

BRIEF DESCRIPTION OF THE DRAWINGS

FIG. 1 is a block diagram illustrating a wireless communication system.

FIG. 2 illustrates an example of a frame structure.

FIG. 3 is a flowchart illustrating a network initialization procedure of initializing a network according to an embodiment of the present invention.

FIG. 4 is a flowchart illustrating a network initialization procedure according to another embodiment of the present invention.

FIG. 5 is a flowchart illustrating a network initialization procedure according to still another embodiment of the present invention.

MODE FOR THE INVENTION

FIG. 1 is a block diagram illustrating a wireless communication system. The wireless communication system is widely disposed so as to provide various communication services such as services for providing voices, packet data, and the like.

Referring to FIG. 1, a wireless communication system includes a mobile station (MS) 10 and a base station (BS) 20. The MS 10 may be fixed or mobile. The MS 10 may be referred to as user equipments (UEs), user terminals (UTs), subscriber stations (SSs), or wireless devices. The BS 20 refers to a fixed station that communicates with the MS 10. The BS 20 may be referred to as a NodeB, a base transceiver system (BTS), or an access point. The BS 20 serves at least one cell.

The wireless communication system may be an orthogonal frequency division multiplexing/orthogonal frequency division multiple access (OFDM/OFDMA) based system. The OFDM uses a plurality of orthogonal subcarriers. The OFDM uses orthogonal characteristic between inverse fast Fourier transformation (IFFT) and fast Fourier transformation (FFT). A transmitter transmits data by performing the IFFT. A receiver recovers original data by performing the FFT. The transmitter uses the IFFT so as to combine multiple subcarriers. In order to separate the multiple subcarriers, the receiver uses the FFT corresponding to the IFFT.

Hereinafter, a slot is the minimum possible data allocation unit and is defined as a subchannel and a time. In uplink direction, the subchannel may be constructed with a plurality of tiles. The subchannel may be constructed with six tiles. In uplink direction, a burst may be constructed with three OFDM symbols and a subchannel. In permutation of partial usage of subchannels (PUSC), each tile may include four contiguous subcarriers over three OFDM symbols. Alternatively, each tile may include three contiguous subcarriers over three OFDM symbols. A bin includes nine contiguous subcarriers in an OFDM symbol. A band indicates a group of four rows of the bin. An adaptive modulation and coding (AMC) subchannel is constructed with six contiguous bins in the same band.

FIG. 2 illustrates an example of a frame structure. A frame is a data sequence used by physical specifications during a fixed time.

Referring to FIG. 2, a frame includes an uplink frame and a downlink frame. In time division duplex (TDD), uplink and downlink transmission share the same frequency at different times. The downlink frame antecedes the uplink frame. The downlink frame starts in the order of a preamble, a frame control header (FCH), a downlink-map (DL-MAP), a uplink-map (UL-MAP), and burst zones. There are guard times for distinguishing the uplink frame from the downlink frame at center part (between the downlink and uplink frames) and last part (next to the uplink frame). A transmit/receive transition gap (TTG) indicates a gap between a downlink burst and a subsequent uplink burst. A receive/transmit transition gap (RTG) indicates a gap between an uplink burst and a subsequent downlink burst.

The preamble is used to initially synchronize a MS with a BS, search for a cell, and estimate a frequency offset and a channel. The FCH includes a length of a DL-MAP message and coding scheme information for the DL-MAP.

The DL-MAP is an area to which the DL-MAP message is transmitted. The DL-MAP message defines an access of a downlink channel. The DL-MAP message includes a configuration change count of a downlink channel descriptor (DCD) and an identifier (ID) of a BS. The DCD describes a downlink burst profile to be applied to a current MAP. The downlink burst profile represents characteristics of a downlink physical channel. The DCD is periodically transmitted by the BS through the DCD message.

The UL-MAP is an area to which the UL-MAP message is transmitted. The UL-MAP message defines an access of an uplink channel. The UL-MAP message includes a configuration change count of an uplink channel descriptor (UCD) and a valid start time of uplink allocation defined by the UL-MAP. The UCD describes an uplink burst profile. The uplink burst profile represents characteristics of an uplink physical channel. The UCD is periodically transmitted by the BS through the UCD message. The UCD message includes information on a backoff window for ranging.

FIG. 3 is a flowchart illustrating a network initialization procedure of initializing a network according to an embodiment of the present invention. Network initialization represents a procedure in which a MS initially enters the network. Network initialization includes downlink synchronization, initial ranging, base capability negotiation and authentication. By the initial ranging, the MS obtains an accurate timing offset and adjusts transmission power.

Referring to FIG. 3, after establishing synchronization with a BS, a MS reads a DL-MAP message transmitted from the BS (S110). When the MS is turned on or lose connection, the MS scans a downlink channel and establishes downlink synchronization with the BS. When receiving at least one DL-MAP message, the MS can achieve medium access control (MAC) synchronization. When achieving the MAC synchronization, the MS can receive the DL-MAP message, a DCD message and a UCD message. After synchronization, the MS waits for a UCD message from the BS and obtains a transmission parameter for an available uplink channel. The UCD message includes a time when a ranging request is transmitted and a frequency in which the ranging request is transmitted. The UCD message may specify one or more groups of six (or eight) contiguous subchannels for which a contention based ranging is performed. The contention based ranging means that at least two MS can start ranging through the same subchannel at the same time.

In order to search for an initial ranging interval, the MS reads a UL-MAP message (S115). The BS allocates the initial ranging interval constructed with at least one transmission opportunity. The transmission opportunity is allocation provided by the UL-MAP so that an authorized predetermined group of MSs transmits an initial ranging request.

The MS transmits a ranging request (RNG-REQ) message (S120). The ranging request message determines a network delay. The ranging request message is transmitted by the MS so as to request a change in power and/or downlink burst profile. The MS randomly selects a ranging slot in a backoff window included in the UCD message and randomly selects a code division multiple access (CDMA) code from a series of allowed codes. The CDMA code may use a pseudo-random bit sequence (PRBS) binary phase shift keying (BPSK) code.

Multiple MSs which transmit same CDMA codes on the same ranging slot are in contention state.

When there is no response from the BS, the MS transmits the ranging request message by increasing power level in the next contention slot (S125).

The BS transmits a ranging response (RNG-RSP) message to indicate that the CDMA code is successfully received (S130). Since the BS does not know which MS transmits the CDMA code, the BS designates the CDMA code and a slot so as to enable the MS to confirm itself. The ranging response message is a broadcast message. The BS determines a symbol timing offset due to transmission delay, Doppler shift or a frequency offset due to inaccuracy of an oscillator, receiving power, and the like. The BS transmits correction data to the MS through the ranging response message. The MS and BS continue to exchange the ranging response message until power, timing and frequency are aligned. The ranging response message includes information on ranging status. When the ranging status is 'continue', the MS adjusts parameters designated by the ranging response message and registers another CDMA code after suitable backoff delay although the transmission opportunity is not successful.

When the ranging status of the ranging response message is 'continue', the MS continuously transmits the CDMA code through the ranging request message (S135). The MS updates the timing and the power designated by the ranging response message and transmits the ranging request message.

The BS transmits the ranging response message of which ranging status is 'success' and allocates a bandwidth to the MS (S140). The BS continues to perform a fine tuning process through the ranging response message. The ranging request/response processes are repeated until the BS transmits a ranging response message including the ranging status which is successful or abort. The BS transmits a session key to the MS when the ranging status is successful. The session key is a shared key for ciphering a message between the BS and the MS until authentication is completed during the initial ranging. Data confidentiality represents that data is protected from unauthenticated exposure. The data confidentiality may be secured through ciphering. Ciphering is that data to be exchanged between a transmitter and a receiver is converted into a form that is not recognized by a third one. A ciphering algorithm and a ciphering key are needed so as to perform the ciphering. If the cipher algorithm is known both the MS and the BS, the session key is the ciphering key.

The MS transmits a ranging request message including a unique identifier of its own which is ciphered through the allocated slot (S145). For example, the MS ciphers a medium access control (MAC) address of its own by using the session key and transmits the ranging request message including the ciphered MAC address. Security association is established during initial ranging. The security association represents a series of security information shared by the BS and at least one MS so as to support secure communication in a network. The security association is established between the MS and the BS by sharing the session key. When a ranging response message indicating that ranging status is successful is transmitted, the MS temporarily negotiates the security association with the BS. Here, the temporary security association means security association that is used until the authentication begins between the MS and the BS.

During the initial ranging contention may occur. Accordingly, when the ranging status is successful, an unique identifier for identifying the corresponding MS is necessary to resolve contention. At this time, if the unique identifier of the MS such as the MAC address is directly transmitted, location privacy problem may occur. The MAC address is uniquely assigned in a manufacturing procedure and used to identify the MS. The unique identifier of the MS which is used for a universal mobile telecommunication system (UMTS) may be an international mobile subscriber identity (IMSI) or international mobile equipment identity (IMEI). The IMSI is a private record stored in a subscriber identify module (SIM) and a home location register (HLR). The IMEI discloses a terminal manufacturer, a model number, and a serial number. In order to prevent the unique identifier of the MS from being exposed to a malicious attacker while not causing serious overload in the network, the BS allocates a session key to be temporarily used by the MS during the initial ranging. Accordingly, the unique identifier of the MS may not be exposed until the authentication is completed.

The BS identifies the MS through the received identifier and transmits the ranging response message including a ciphered primary management connection identifier (CID) (S150). The CID indicates a value for confirm connection between the BS and the MS in MAC. The primary management CID indicates a CID for connection that is established during the initial ranging and used to transmit a delay-tolerant MAC message. Since the BS shares the session key with the MS, the MS can decipher the primary management CID although the primary management CID is ciphered through the cipher algorithm. Accordingly, the initial ranging is completed. The MS can protect various types of information and control signaling which are to be exchanged between the MS and the BS through the session key, thereafter. That is, it is possible to cipher the MAC message that is to be exchanged between the MS and the BS after the security association is established in the initial ranging. Accordingly, it is possible to securely exchange the MAC message even until the authentication is completed.

The BS and the MS negotiates basic capability (S160). After the initial ranging is completed, the MS transmits a basic capability request (SBS-REQ) message including basic capability of its own. The basic capability of the MS includes information on whether automatic repeat request (ARQ) is supported and information on whether MAC level cyclic redundancy check (CRC) is supported. The BS transmits a basic capability response (SBC-RSP) message in response to the basic capability response (SBC-RSP) message.

The MS and the BS authenticates each other and exchanges an authorization key (S170).

The MS transmits a registration request (REG-REQ) message (S180). The registration request message includes the primary management CID.

The BS transmits a registration response (REG-RSP) message in response to the registration request message (S185). The registration response message includes a secondary management CID. The secondary management CID is established while registering the MS and used to transmit a standards-based message such as simple network management protocol (SNMP) or dynamic host configuration protocol (DHCP).

After registering the MS, IP connectivity is established and time of day is established. Other operation parameters are transmitted. Consequently, the connection is set up.

The initial ranging is performed when the MS wants to access the network and is constructed with a series of exchanges of ranging request messages and ranging response messages. During the initial ranging, the unique identifier of the MS may be exposed to a malicious attacker if the unique identifier is transmitted to the network without considering location privacy. The location privacy can be called as an active or passive attack with respect to the unique identity of the MS. The location privacy includes hijack of the MS's identifier exchanged between the network and the MS and various attacks using MS's identifier. For example, the malicious attacker that obtains the MAC address may pretend to be a normal MS. In order to secure the location privacy, various MAC messages are ciphered and then transmitted during the initial ranging. For example, it is possible not to expose the MAC address to the malicious attacker by transmitting ciphered MAC address. The initial ranging is performed when initializing the network or performing handover and control signaling during the initial ranging is secured. Also, the control signaling until the authentication begins can be protected. This protection is achieved by temporarily negotiating security association between the MS and the BS during the initial ranging. This temporary security association is valid until the authentication is performed.

When a MS try to access a network, the network and the MS negotiate the security association with each other. A control message such as a MAC address or MAC message is ciphered and transmitted after establishing the security association. It is possible to prevent the MAC address from being exposed to malicious attackers. The temporary security association can also ensure secure transmission of various MAC messages before the authentication is completed.

FIG. 4 is a flowchart illustrating a network initialization procedure of initializing a network according to another embodiment of the present invention.

Referring to FIG. 4, a MS reads a DL-MAP message transmitted from a BS (S210). After synchronization with the BS, the MS waits for a UCD message from the BS and obtains a transmission parameter on an available uplink channel. In order to search for an initial ranging interval, the MS reads the UL-MAP message (S215). The MS transmits the ranging request (RNG-REQ) message (S220). When there is no response from the BS, the BS transmits the ranging request message by increasing a power level on the next contention slot (S225).

The BS transmits a ranging response (RNG-RSP) message indicating that the CDMA code is successfully received (S230). When ranging status in the ranging response message is 'continue', the MS continuously transmits the ranging request message (S235). The BS transmits a ranging response message indicating that the ranging status is successful and allocates bandwidth to the MS (S240). The BS continues to perform fine tuning using the ranging response message. The ranging request/response processes are repeated until the BS transmits a ranging response message indicating that the ranging status is successful.

The MS that receives the ranging response message indicating that the ranging status is successful transmits a ranging request message including a MS public key (S250). The BS that receives the ranging request message including the MS public key transmits the ranging response message including a BS public key (S255). Accordingly, the security association is established. The security association between the MS and the BS is established by sharing the MS public key and the BS public key. When receiving a ranging response message indicating that the ranging status is successful, the MS temporarily negotiates the security association with the BS.

The MS transmits a ranging request message including a unique identifier of its own which is ciphered (S260). After deciphering the unique identifier and identifying the MS through the unique identifier, the BS transmits a ranging response message including a ciphered primary management connection identifier (CID) (S265). Since the BS shares the session key with the MS, the BS can transmit the ciphered primary management CID. Accordingly, the initial ranging is completed. Various types of information and control signaling which are to be exchanged between the MS and the BS can be protected by using the session key, thereafter.

The BS and the MS negotiates basic capability (S270). The MS and the BS authenticates each other and exchanges an authorization key (S275). The MS transmits a registration request (REG-REQ) message (S280). The registration request message includes the primary management CID. The BS transmits the registration response (REG-RSP) message in response to the registration request message (S285). The registration response message includes a secondary management CID.

Now, a key distribution method using a public key is disclosed.

It is assumed that both the MS and the BS know a prime number p and a primitive root a. The primitive root a is less than a prime number p (a<q). The MS selects a random integer $X_{MS}$ less than the prime number p ($X_{MS}$<p). In addition, the BS selects a random integer $X_{BS}$ less than the prime number p ($X_{BS}$<P). Here, $X_{MS}$ is the MS management key, and $X_{BS}$ is the BS management key.

The MS and the BS respectively obtains a MS public key $Y_{MS}$ and a BS public key $Y_{BS}$ as shown MathFigure 1

$$Y_{MS} = a^{X_{MS}} \bmod q, Y_{BS} = a^{X_{BS}} \bmod q \qquad \text{[Math.1]}$$

where 'mod' denotes a modulo operation.

The BS that receives the MS public key $Y_{MS}$ can obtain a BS ciphering key $K_{BS}$ as follows.

MathFigure 2

$$K_{BS} = (Y_{MS})^{X_{BS}} \bmod q \qquad \text{[Math.2]}$$

The MS that receives the BS public key $Y_{BS}$ can obtain a MS ciphering key $K_{MS}$ as follows.

MathFigure 3

$$K_{MS} = (Y_{BS})^{X_{MS}} \bmod q \qquad \text{[Math. 3]}$$

By using a modulo operation rule and the definition of the primitive root, it can easily be verified that the value of the BS ciphering key $K_{BS}$ is the same as that of the MS ciphering key $K_{MS}$ as follows.

MathFigure 4

$$\begin{aligned} K_{BS} &= (Y_{MS})^{X_{BS}} \bmod q \qquad \text{[Math. 4]} \\ &= (a^{X_{MS}})^{X_{BS}} \bmod q \\ &= (a^{X_{BS}})^{X_{MS}} \bmod q \\ &= (Y_{BS})^{X_{MS}} \bmod q \\ &= K_{MS} \end{aligned}$$

Specifically, for example, it is assumed that the prime number p is seven, and the primitive root a is three. If the MS arbitrarily selects the MS management key $X_{MS}$=2, the MS public key is $Y_{MS}$=32 mod 7=2. The MS transmits the MS public key $Y_{MS}$=2. When the BS arbitrarily selects the BS management key $X_{BS}$=3, the BS public key is $Y_{BS}$=33 mod 7=6. The MS transmits the BS public key $Y_{BS}$=6. The MS ciphering key is $K_{MS}$=62 mod 7=1, and the BS ciphering key is $K_{BS}$=23 mod 7=1. The MS and the BS share the same ciphering key by exchanging the MS public key and the BS public key.

The BS and the MS can negotiate by exchanging public keys without exposing the ciphering key. After reporting the successful ranging, another method may be applied to a key distribution protocol that is available for the MS and the BS. The key distribution protocol is not limited to a specific protocol.

FIG. 5 is a flowchart illustrating a network initialization procedure of initializing a network according to still another embodiment of the present invention.

Referring to FIG. 5, a MS reads a DL-MAP message transmitted from a BS (S310). After synchronization with the BS, the MS waits for a UCD message from the BS and obtains a transmission parameter on an available uplink channel. In order to search for an initial ranging interval, the MS reads the UL-MAP message (S315). The MS transmits a ranging request (RNG-REQ) message (S320). When there is no response from the BS, the BS transmits a ranging request message by increasing a power level on the next contention slot (S325).

The BS transmits a ranging response (RNG-RSP) message indicating that the ranging request message is successfully received (S330). When the ranging status in the ranging response message is 'continue', the MS continuously transmits the ranging request message (S335). The BS transmits a ranging response message indicating that the ranging status is successful and allocates bandwidth to the MS (S340). The BS continues to perform a fine tuning process using the ranging response message. The ranging request/response processes are repeated until the BS transmits the ranging response message indicating that the ranging status is successful.

The MS that receives the ranging response message transmits the ranging request message including a certificate of its own (S350).

The BS that receives the ranging request message including the certificate extracts a public key and randomly generates a temporary session key (TSK). The BS transmits a ranging response message including the ciphered TSK (S355). The BS generates the TSK by using information included in the certificate (for example, a MAC address and a public key of the MS). The TSK is a session key used while performing the initial ranging. The BS ciphered the TSK by using the public key of the MS and transmits the ciphered TSK. Accordingly, the security association is established since the BS and the MS can exchange ciphered signaling messages by using the TSK.

The MS transmits a ranging request message including a ciphered unique identifier of its own (S360). After deciphering the unique identifier and identifying the MS through the unique identifier, the BS transmits a ranging response message including a ciphered primary management connection identifier (CID) (S365). Since the BS shares the session key with the BS, the BS can transmit the ciphered primary management CID. Accordingly, the initial ranging is completed. Various types of information and control signaling which are to be exchanged between the MS and the BS can be protected by using the session key, thereafter.

The BS and the MS negotiates basic capability (S370). The MS and the BS authenticates each other and exchanges an authorization key (S375). The MS transmits a registration request (REG-REQ) message (S380). The registration request message includes the primary management CID. The BS transmits a registration response (REG-RSP) message in response to the registration request message (S385). The registration response message includes a secondary management CID.

During initial ranging, the MAC address, various types of information of the MS and control signaling have to be securely exchanged between the BS and the MS. Since these are basically used to identify the MS or negotiate basic capability of the MS, data confidentiality is needed. By establishing temporary security association during the initial ranging, it is possible to prevent exposure of these.

All the aforementioned functions may be performed by a processor such as a microprocessor according to software or program codes which are coded so as to perform the aforementioned function, a controller, a microcontroller, an application specific integrated circuit (ASIC), and the like. It will be understood those skilled in the art how to design, develop, and embody the codes based on the description of the present invention.

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. A method of enabling a mobile station to perform initialization to a base station in a wireless communication system, the method comprising:
   synchronizing, by the mobile station, with the base station;
   obtaining, by the mobile station, an uplink parameter based on the synchronization;
   performing, by the mobile station, an initial ranging the uplink parameter; and
   establishing, by the mobile station, a security association between the mobile station and the base station while performing the initial ranging,
   wherein the initial ranging comprises:
      transmitting a first ranging request message including a randomly selected code division multiple access (CDMA) code to the base station;
      in response to the first ranging request message, receiving at least one first ranging response message from the base station, the at least one first ranging response message including an indication that a ranging status is successful and a session key when the ranging status is successful, the session key being a shared key for ciphering a message between the base station and the mobile station until authentication is completed;
      after receiving the first ranging response message, transmitting a second ranging request message, including a ciphered unique identifier of the mobile station, to the base station; and
      in response to the second ranging request message, receiving a second ranging response message including a ciphered primary management connection identifier (CID) from the base station, the ciphered primary management CID indicating a CID for a connection established during the initial ranging, the CID indicating a value for confirming the connection between the base station and the mobile station in a media access control (MAC) layer, and
   wherein the security association is established when the first ranging response message including the session key is received from the base station.

2. The method of claim 1, wherein the first ranging response is a broadcast.

3. The method of claim 1, further comprising:
   deciphering the ciphered primary management CID included in the second ranging response message with the shared key.

4. The method of claim 1, wherein the ciphered unique identifier of the mobile station and the ciphered primary management CID of the base station are ciphered by using the session key.

5. The method of claim 1, wherein the ciphered unique identifier of the mobile terminal is a medium access control (MAC) address of the mobile station.

6. A method of performing, by a mobile station, an initial ranging in a wireless communication, the method comprising:
transmitting a first ranging request message, including a randomly selected code division multiple access (CDMA) code, to a base station;
in response to the first ranging request message, receiving a first ranging response message from the base station, the first ranging response message indicating that a ranging status is successful;
after receiving the first ranging response message, transmitting a second ranging request message including a mobile station public key for ciphering;
in response to the second ranging request message, receiving a second ranging response message, the second ranging response message including a base station public key; and
transmitting a third ranging request message, including a ciphered unique identifier of the mobile station, to the base station; and
receiving a third ranging response message, including a ciphered primary management connection identifier (CID), from the base station, the ciphered primary management CID indicating a CID for a connection established during the initial ranging, the CID indicating a value for confirming the connection between the base station and the mobile station in a media access control (MAC) layer.

7. The method of claim 6, wherein the mobile station public key is obtained by the equation below:

$$Y_{MS} = a^{X_{MS}} \bmod p,$$

where $Y_{MS}$ is the mobile station public key, p is a prime number known by both the mobile station and the base station, a is a primitive root which is less than the prime number p, and $X_{MS}$ is a random integer less than the prime number p.

8. The method of claim 6, wherein the base station public key is obtained by the equation below:

$$Y_{BS} = a^{X_{BS}} \bmod p,$$

where $Y_{BS}$ is the base station public key, p is a prime number known by both the mobile station and the base station, a is a primitive root which is less than the prime number p, and $X_{BS}$ is a random integer less than the prime number p.

9. A mobile station configured to perform initialization with a base station in a wireless communication system, the mobile station comprising:
a processor configured to:
synchronize with the base station,
obtain an uplink parameter based on the synchronization,
perform an initial ranging using the uplink parameter, and
establish a security association between the mobile station and the base station while performing the initial ranging,
wherein, for the initial ranging, the processor is configured to:
transmit a first ranging request message, including a randomly selected code division multiple access (CDMA) code, to the base station,
in response to the first ranging request message, receive at least one first ranging response message from the base station, the at least one first ranging response message including an indication that a ranging status is successful and a session key when the ranging status is successful, the session key being a shared key for ciphering a message between the base station and the mobile station until authentication is completed,
after receiving the first ranging response message, transmit a second ranging request message, including a ciphered unique identifier of the mobile station, to the base station, and
in response to the second ranging request message, receive a second ranging response message, including a ciphered primary management connection identifier (CID), from the base station, the ciphered primary management CID indicating a CID for a connection established during the initial ranging, the CID indicating a value for confirming the connection between the base station and the mobile station in a media access control (MAC) layer, and
wherein the security association is established when the first ranging response message including the session key is received from the base station.

10. A mobile station configured to perform an initial ranging in a wireless communication, the mobile station comprising:
a processor configured to:
transmit a first ranging request message, including a randomly selected code division multiple access (CDMA) code, to a base station,
in response to the first ranging request message, receive a first ranging response message from the base station, the first ranging response message indicating that a ranging status is successful,
after receiving the first ranging response message, transmit a second ranging request message including a mobile station public key for ciphering,
in response to the second ranging request message, receive a second ranging response message, the second ranging response message including a base station public key,
transmit a third ranging request message, including a ciphered unique identifier of the mobile station, to the base station, and
receive a third ranging response message, including a ciphered primary management connection identifier (CID), from the base station, the ciphered primary management CID indicating a CID for a connection established during the initial ranging, the CID indicating a value for confirming the connection between the base station and the mobile station in a media access control (MAC) layer.

* * * * *